June 6, 1939.　　F. S. DENISON ET AL　　2,161,248

CONTROL DEVICE

Filed Dec. 20, 1934　　2 Sheets-Sheet 1

Inventor
**Frederick S. Denison
Carl G. Kronmiller**

By　George H. Fisher

Attorney

June 6, 1939.  F. S. DENISON ET AL  2,161,248
CONTROL DEVICE
Filed Dec. 20, 1934   2 Sheets-Sheet 2

Inventor
**Frederick S. Denison
Carl G. Kronmiller**
By George H. Fisher
Attorney Patented June 6, 1939

2,161,248

UNITED STATES PATENT OFFICE 2,161,248

CONTROL DEVICE

Frederick S. Denison and Carl G. Kronmiller, Minneapolis, Minn., assignors to Minneapolis-Honeywell Regulator Company, Minneapolis, Minn., a corporation of Delaware Application December 20, 1934, Serial No. 758,416

10 Claims. (Cl. 236—84)

The present invention relates to motor operated devices such as for controlling fuel valves, air dampers, pilot valves and the like and the invention includes not only the general combinations to be hereinafter described but also the various sub-combinations contained therein.

The present invention has particular utility in controlling gas valves by means of pressure motors which are operated by the pressure of the gas under the control of one or more control valves that may be automatically or manually operated, or both. Features of the invention reside in the control of the pressure motor as well as the manner in which the pressure motor, or for that matter any motor, controls a plurality of devices.

An object of the present invention is the provision of an improved control system for controlling pressure motors.

Another object of the invention is the provision of a control arrangement in which a single motor operates a fuel valve, an air damper and a pilot valve.

A further object of the invention is the provision of a mechanism by which a single motor first operates a pilot valve, or an air damper, or both, and then operates a fuel valve, whereby the pilot is opened or expanded or the air damper is opened or partly opened, or both of these functions take place, prior to opening of the fuel valve.

Other objects of the invention include the detailed manner in which the above results are obtained and include such details in combination with the improved pressure motor control system.

Further objects will be found in the drawings, detailed description and appended claims.

For a more complete understanding of the invention, reference may be had to the following detailed description and accompanying drawings, in which.

Figure 1:
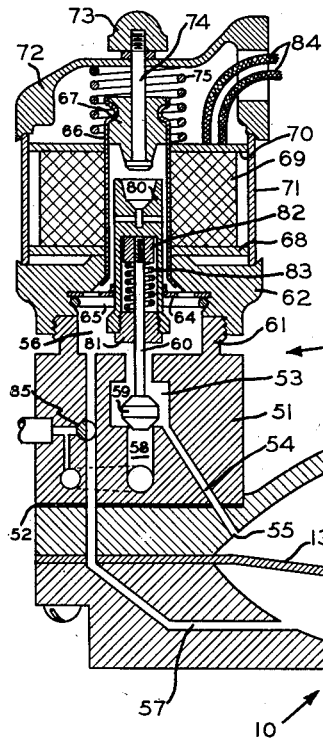
Fig. 1 is a sectional view of one modification of the present invention.
Figure 1:
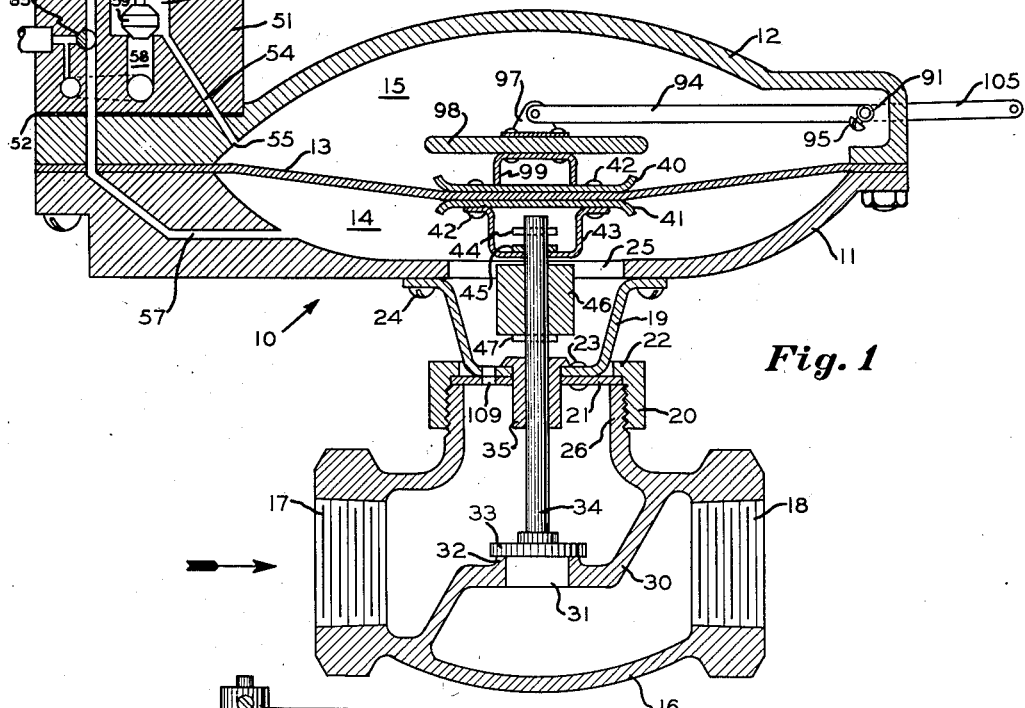
Figure 2:
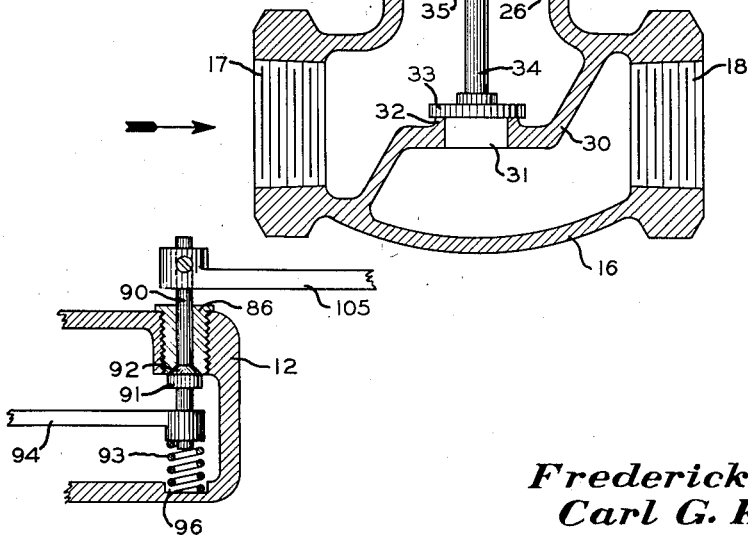
Fig. 2 is a detail of certain parts of the pressure motor shown in Fig. 1.

Referring first to Figs. 1 and 2, the apparatus of the present invention includes a motor means, generally indicated at 10, which is herein shown in the form of a pressure motor although it will become apparent as this description proceeds that many of the features of the present invention are applicable to motors of other types. The pressure motor 10 comprises a lower casting 11, an upper casting 12, and a diaphragm 13 which is sealed between the lower and upper castings 11 and 12. The lower casting 11 and the diaphragm 13 form a pressure chamber 14 of which the diaphragm 13 constitutes a movable wall. Similarly, the upper casting 12 and diaphragm 13 form a sealed chamber 15 of which the diaphragm 13 likewise constitutes a movable wall. The diaphragm 13 is adapted to control the flow of fluid through a valve having a casing 16 that is provided with the usual inlet 17 and outlet 18. This valve casing 16 is secured to the lower casting 11 by an assembly which comprises a bracket 19, a collar 20 and a circular disc 21. The collar 20 is provided with a flange 22 which overlies the circular disc 21 and the circular disc 21 is secured to the bracket 19 by any suitable means such as the rivets 23. The bracket 19 is secured to the lower casting 11 as by screws 24 and this lower casting 11 is provided with an opening 25 so that pressure chamber 14 communicates with the interior of bracket 19. The valve casing 16 is provided with an upwardly extending cylindrical extension 26 that is exteriorly screw-threaded so that the collar 20 can be screw-threaded thereon and thereby firmly clamps the end of cylindrical extension 26 against the circular disc 21 in fluid-tight relation.

The valve casing 16 is provided with the usual partition wall 30, having an opening 31 therein, to thereby form a valve seat 32. A valve disc 33 cooperates with the valve seat 32 and is carried by a valve stem 34. The valve stem 34 extends upwardly through a guide or bushing 35 that is fixed to the bracket 19 and extends downwardly through the circular disc 21. The valve stem 34 further extends upwardly into and terminates within the pressure chamber 14.

Counter-weights 40 and 41 are located on the upper and lower sides of diaphragm 13 substantially at the center thereof and are secured thereto by suitable means such as rivets 42. A bracket 43 is also secured to the lower side of diaphragm 13 and preferably by means of these same rivets 42 which secure the counter-weights 40 and 41 thereto. The valve stem 34 extends through the bracket 43 and is provided with a pin 44 extending therethrough so that upward movement of bracket 43 first results in taking up the lost motion between the bracket 43 and pin 44 and thereafter the bracket 43 engages the pin 44 to lift valve disc 33 from engagement with valve seat 32. A washer 45 is preferably interposed between the upper surface of bracket 43 and the pin 44. Valve stem 34 also passes through a counter-weight 46. The downward movement of counter-weight 46 on valve stem 34 is limited as by means of a pin 47.

From the foregoing, it will be apparent that the valve disc 33 is normally biased towards closed position by the counter-weight 46 and the diaphragm 13 is normally biased to its lower position, in which it is shown, by means of counter-weights 40 and 41. As a result, if the pressures in pressure chamber 14 and sealing chamber 15 are equal, the diaphragm 13 and the valve disc 33 are moved to the position shown in Fig. 1. However, if the pressure in pressure chamber 14 is made substantially greater than the pressure in sealing chamber 15, then the diaphragm 13 will move upwardly. Initial upward movement serves to take up the lost motion between washer 45 and pin 44. Thereafter, the valve stem 34 is raised to lift valve disc 33 from engagement with the valve seat 32. Then if the pressures in pressure chamber 14 and sealing chamber 15 are again equalized, the diaphragm 13 will move downwardly, allowing valve disc 33 to seat upon valve seat 32 after which the diaphragm 13 will continue its downward movement until it reaches the position shown in Fig. 1.

The pressures in pressure chamber 14 and sealing chamber 15 may be controlled in any desirable manner and, in the apparatus of Fig. 1, have been shown as controlled by an electrically operated control valve mechanism generally indicated at 50. This control valve mechanism 50 includes a control valve casting 51 that is suitably secured to the upper casting 12, there preferably being a sealing gasket 52 interposed between the control valve casting 51 and the upper casting 12. The control valve casting 51 is provided with a control chamber 53 that is connected to the sealing chamber 15 by means of passages 54 and 55 which are respectively formed in the control valve casting 51 and the upper casting 12. The control chamber 53 is further placed in communication with the pressure chamber 14 by means of passages 56 and 57 which are respectively formed in the control valve casting 51 and the upper and lower castings 12 and 11. The control chamber 53 also is arranged to communicate with the exterior of control valve casting 51 by means of a passage 58 formed therein. Communication between passages 58 and either passage 54 or passage 56 is controlled by a valve head 59 that is secured to an upwardly extending valve stem 60.

The control valve casting 51 is provided with an upwardly extending cylindrical extension 61 that is exteriorly screw-threaded and receives a casting 62 of substantially circular formation. This casting 62 receives a circular spring washer 64 which is held in place by a spring clip 65. The casting 62 also supports an upwardly extending nonmagnetic, but electrically conductive, tubular shell 66 that has its upper end closed off by a non-magnetic but conductive plug 67. Surrounding the tubular shell 66 is a first magnetic steel disc 68, an electromagnetic coil 69 and a second magnetic steel disc 70. A cylindrical housing 71 surrounds the discs 68 and 70 and electromagnetic winding 69 and rests upon the casting 62. An upper casting 72 is held in engagement with the upper edge of cylindrical housing 71 by means of a nut 73 which cooperates with a magnetic screw 74 that extends upwardly through the plug 67. A coiled spring 75 is preferably interposed between the under surface of casting 72 and the upper surface of disc 70 to press the disc 70, electromagnetic winding 69 and the disc 68 against the casting 62.

Located within the tubular shell 66 is an armature or plunger 80 that is provided with an internal bore which is closed off by a threaded plug 81. The valve stem 60 extends through the plug 81 and terminates within the plunger formed by the bore in plunger 80 and the plug 81. A collar 82 is threaded upon the terminal end of valve stem 60 and a coiled spring 83 is interposed between the collar 82 and the plug 81 whereby the collar 82 is normally held against the plunger 80. The electromagnetic winding 69 is provided with lead wires 84.

When the electromagnetic coil 69 is deenergized, the valve head 59 is in the position shown in Fig. 1 of the drawings wherein pressure chamber 14 and sealing chamber 15 are placed in communication with each other by means of passages 57 and 56, control chamber 53 and passages 54 and 55. The pressures in pressure chamber 14 and sealing chamber 15 are therefore equal. If the electromagnetic coil 69 be energized however, the plunger 80 moves upwardly and moves valve head 59 upwardly to close off communication between passage 54 and passage 56 and to establish communication between passage 54 and passage 58. The pressure in sealing chamber 15 can thereby drain off through passages 55 and 54, control chamber 53 and passage 58, so that the pressure chamber 14 may be subjected to a higher pressure than is present in the sealing chamber 15. In this manner, if the pressure chamber 14 is subjected to a source of pressure, deenergization of electromagnetic coil 69 causes such pressure to be applied both to the pressure chamber 14 and the sealing chamber 15. Energization of electromagnetic winding 69, however, prevents the flow of fluid from the pressure chamber 14 and operates to exhaust the sealing chamber 15 whereby the diaphragm 13 moves upwardly to lift valve disc 33 from valve seat 32.

A manually operable valve 85 is preferably provided to enable lifting of the diaphragm under manual control. If the manually operable valve 85 is turned a quarter revolution in counter-clockwise direction, as viewed in Fig. 1, then the passage 57 is closed off and the sealing chamber 15 placed in communication with exhaust pipe 108 irrespective of the position of valve head 59. Under these conditions, the diaphragm 13 will be raised regardless of the position of valve head 59.

For further details of the construction and operation of the control valve 50, reference may be had to the copending application of Willis H. Gille, Ser. No. 740,574, filed August 20, 1934.

In many instances, it is desired that a motor, such as the pressure motor 10 operate a second or auxiliary control device in addition to the first control device, such as the main fuel valve shown herein. For this purpose, a shaft 90 extends through a bushing 86 threaded into the upper casting 12 so that one of its ends terminates outside of casting 12 and its other end terminates within the sealing chamber 15. This shaft 90 is provided with an enlarged portion 91, there being a conical portion 92 which joins the enlarged portion 91 and the main shaft 90. This conical portion 92 is arranged to engage a conical depression formed in the bushing 86, being placed into such engagement by means of coiled spring 93. One end of this coiled spring 93 abuts an operating lever 94 that is secured to shaft 90, as by a set screw 95, and the other end preferably extends into a depression 96 formed in the upper casting 12. This operating lever 94 terminates centrally in the sealing chamber 15 and is pivoted to a bracket 97 which in turn is secured to a counter-weight 98. A stop member 99 is preferably secured to the lower portion of counter-weight 98. The counter-weight 98 normally biases the operating lever 94 to the position shown in Fig. 1 wherein the stop member 99 engages the upper counter-weight 40 but it will be noted that there is no direct connection between the operating lever 94 and the diaphragm 13.

Figure 3:
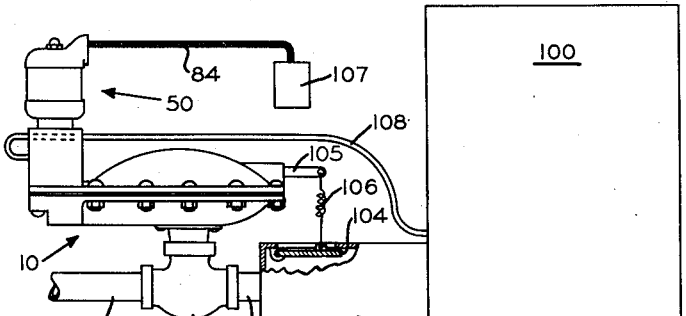
Fig. 3 is a showing of the apparatus of Fig. 1 as applied to a gas-fired heater and controlled by a conventional room thermostat.

Turning now to Fig. 3, the apparatus of the present invention is shown applied to a gas-fired heater 100. The inlet 17 of valve casing 16 is connected to a gas supply pipe 101 and the outlet of valve casing 16 is connected to a pipe 102. The pipe 102 extends through a secondary air housing 103 of usual construction and connects with the burner (not shown) located within heater 100. The secondary air housing 103 is provided with the usual secondary air damper 104 which is connected to shaft 90 by means of a secondary air arm 105 and a connecting spring or cable 106. Any suitable automatic control, such as a room thermostat, is indicated at 107 and is connected to the lead wires 84 of electromagnetic winding 69. The passage 58 is connected to a pipe 108 by which gas exhausted from the sealing chamber 15 may be conducted to any desired point of disposal. In this particular illustration, the pipe 108 is shown leading to the interior of heater 100 so that the exhausted gas may be consumed therein or otherwise disposed of. Pressure from the gas supply line 101 may be transmitted to the pressure chamber 14 by any desirable arrangement and is herein shown as being transmitted thereto by the provision of an opening 109 which extends through the circular disc 21 and bracket 19.

With the control device or room thermostat 107 satisfied so that the electromagnetic winding 69 is deenergized, the pressure chamber 14 and the sealing chamber 15 are in communication with each other as heretofore described so that line pressure flows from the valve casing 16 through opening 109 to pressure chamber 14, through passages 57 and 56 to control chamber 53, and through passages 54 and 55 to the sealing chamber 15. The pressure chamber 14 and sealing chamber 15 are therefore placed under equal pressure so that diaphragm 13 and valve disc 33 assume the position shown in Fig. 1. The operating lever 94 should also be in the position shown in Fig. 1 by reason of its counter-weight 98 and under these conditions secondary air damper 104 is closed. If the room thermostat 107 now calls for heat and energizes the electromagnetic winding 69, the passage 56 will be closed off by raising of valve head 59 as previously described thereby preventing flow of fluid from the pressure chamber 14. Such action also connects the sealing chamber 14 to pipe 108 so that the gas in sealing chamber 15 is exhausted to the heater 100. The pressure in pressure chamber 14 is thereby made larger than the pressure in sealing chamber 15 whereupon diaphragm 13 moves upwardly. Initial upward movement of diaphragm 13 causes clockwise rotation of shaft 91 so that the right end of secondary air arm 105 moves downwardly and begins to open secondary air damper 104. When diaphragm 13 has moved upwardly sufficiently to take up the lost motion between washer 45 and pin 44, the continued upward movement of diaphragm 13 not only opens secondary air damper 104 more widely but also lifts valve disc 33 from engagement with valve seat 32. In this manner, upon a call for heat, the secondary air damper and main fuel valve are both opened, it being noted that the secondary air damper is partially opened before the main fuel valve begins to open. The fuel thus issuing to heater 100 may be ignited in any of the manners well known in the art and the heater 100 in turn serves to raise the temperature of the space in which the main control or room thermostat 107 is located. When the room thermostat 107 becomes satisfied and deenergizes electromagnetic winding 69, the valve head 59 returns to the position shown in Fig. 1 so that sealing chamber 15 is no longer connected to the pipe 108 but is again placed in communication with pressure chamber 14. The pressures in pressure chamber 14 and sealing chamber 15 will thereby be equalized and the diaphragm 13 will begin moving downwardly under the biasing force of counterweights 40, 41 and 46. When the diaphragm 13 has moved downwardly sufficiently, valve disc 33 will again engage valve seat 32 but continued downward movement of diaphragm 13 will be permitted by reason of the lost motion connection between valve stem 34 and bracket 43. During this downward movement of diaphragm 13, the counter-weight 98 should cause counterclockwise rotation of shaft 90 with a consequent raising of the right hand end of secondary air arm 105 to close the secondary air damper 104. But if any of these parts should stick so that the shaft 91 does not return to the position shown in Fig. 1, it will be evident that the diaphragm 13 can move downwardly to close the main fuel valve nevertheless, since the operating lever 94 only has a one way connection with the diaphragm 13. During this closing movement, of course, the valve disc 33 will seat upon valve seat 32 before the secondary air damper 104 is completely closed.

If it should be desired to manually open the main fuel valve, this can be accomplished by operating manual valve 85 in the manner heretofore set out.

If the diaphragm 13 should become ruptured so that gas flows from the pressure chamber directly to the sealing chamber 15, then the pressure in such chambers will be equalized, irrespective of the position of manual valve 85 or the valve head 59. In the event the valve head 59 is raised during such time, the pressure in pressure chamber 14 and sealing chamber 15 will tend to exhaust through the pipe 108 but the valve disc 33 will remain in engagement with the valve seat 32 or will move into engagement therewith since the pressures in pressure chamber 14 and the sealing chamber 15 are equal, it being remembered that the diaphragm 13 is biased to its lowermost position by counter-weights 40 and 41 and the valve disc 33 is additionally biased to closed position by the counter-weight 46.

Figure 4:
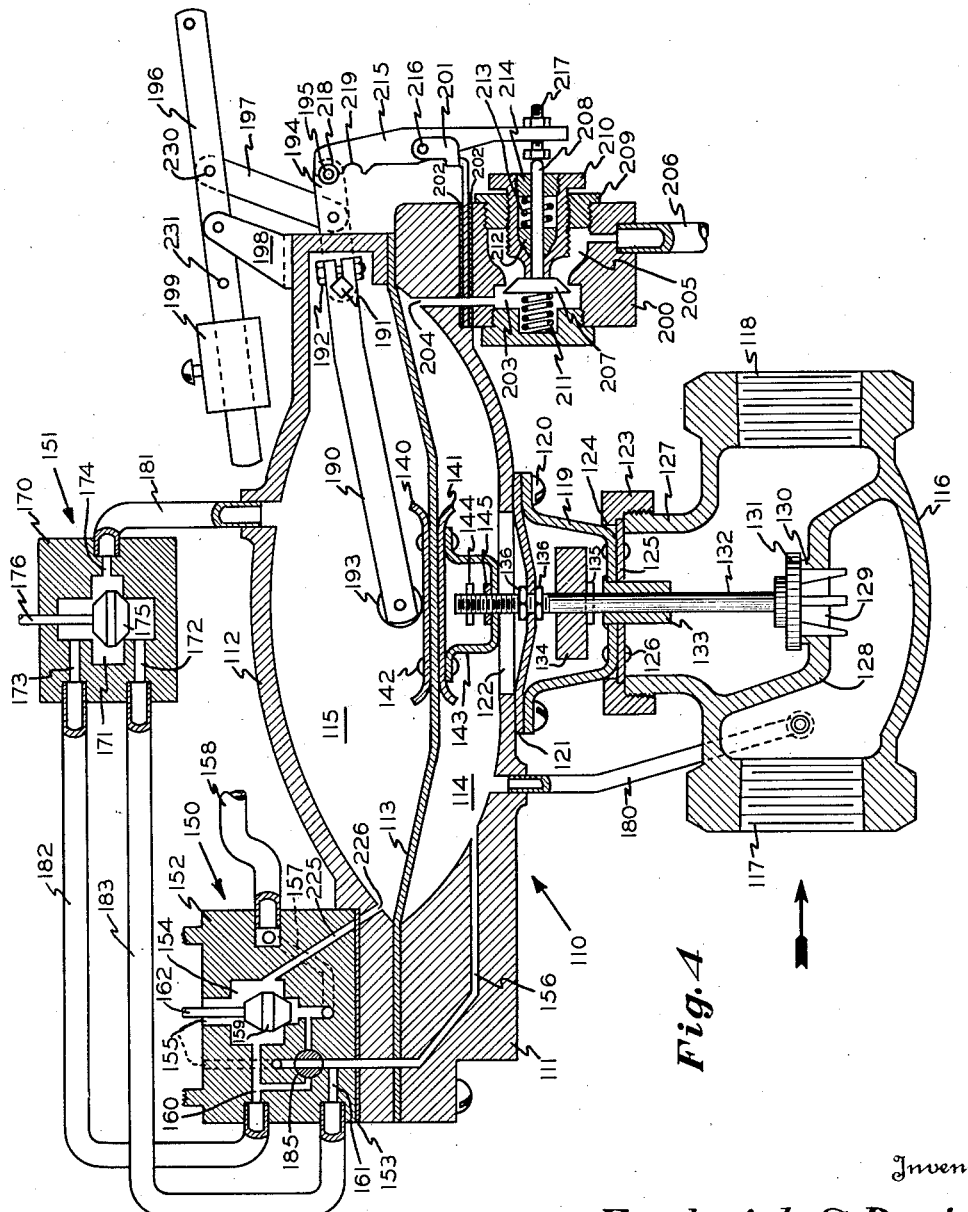
Fig. 4 is a sectional view of a modified form of the invention.

Turning now to Fig. 4, an improved and modified form of the invention is disclosed. Here again, the motor means is illustrated as a pressure motor, generally indicated at 110, although motors of other types could well be used as to certain phases of the invention. This pressure motor 110 is comprised by a lower casting 111 and an upper casting 112 which seal a diaphragm 113 therebetween. The lower casting 111 and the diaphragm 113 form a pressure chamber 114 of which the diaphragm 113 constitutes a movable wall. Similarly, the upper casting 112 and the diaphragm 113 form a sealing chamber 115 of which the diaphragm 113 also constitutes a movable wall.

The diaphragm 113 controls a valve mechanism that includes a valve casing 116 which is provided with the usual inlet port 117 and the usual outlet port 118.

A bracket 119 is secured to the lower casting 111 as by means of screws 120, there being a sealing diaphragm 121 interposed between the bracket 119 and the lower casting 111. The lower casting 111 is provided with an opening 122 which is sealed off by this sealing diaphragm 121. A collar 123 is provided with a flange 124 that overlies the edge of a circular disc 125 which is secured to the bracket 119 by any suitable means such as the rivets 126. The collar 123 is threaded upon a cylindrical extension 127 of the valve casing 116 whereby the valve casing 116 is securely clamped to the disc 125 in a fluid tight manner.

The valve casing 116 is provided with the usual partition wall 128 that is provided with a valve opening 129 which in turn defines a valve seat 130. A valve disc 131 cooperates with the valve seat 130 to prevent or permit communication between the inlet 117 and the outlet 118. The valve disc 131 is carried by a valve stem 132. The valve stem 132 extends upwardly through a guide or bushing 133 which is secured to bracket 119 and extends downwardly through the disc 125. Loosely mounted upon the valve stem 132 and located within the chamber formed by bracket 119 and the sealing diaphragm 121 is a counter-weight 134, the limit of downward motion of which upon the valve stem 132 is limited by a pin 135 which extends through the valve stem 132. The valve stem 132 is sealed to the sealing diaphragm 121 by nuts 136 which are threaded upon the valve stem 132 and engage opposite sides of diaphragm 121.

A pair of counter-weights 140 and 141 are secured respectively to the upper and lower surfaces of diaphragm 113 and substantially centrally thereof as by means of rivets 142. A bracket 143 is also secured to the underside of diaphragm 113 and preferably by these same rivets 142. A pin 144 extends through the upper end of valve stem 132 and is adapted to be engaged by a washer 145, upon upward movement of bracket 143 whereby a lost motion connection is provided between the diaphragm 113 and the valve stem 132.

In this embodiment of the invention, the pressures in pressure chamber 114 and in sealing chamber 115 are shown controlled by two control valve mechanisms generally indicated at 150 and 151. The control valve mechanism 150 includes a casting 152 that may conveniently correspond in general outline to the casting 51 of the apparatus of Fig. 1 and is supported by and secured to the upper casting 112, there being a sealing gasket 153 interposed therebetween. Casting 152 is provided with a control chamber 154 which communicates with the pressure chamber 114 by means of passages 155 and 156. The control chamber 154 also communicates with a passage 157 which leads to the exterior of casting 152 and may be conveniently connected to an exhausting pipe 158. A valve head 159, which is located in the control chamber 154, serves selectively to close off the passage 157 or the passage 155. The control casting 152 further is provided with a passage 160 that directly connects the control chamber 154 with the exterior of the casting 152 and is provided with a passage 161 that connects the exterior of casting 152 with the passage 155. The valve head 159 is secured to a valve stem 162 which corresponds to the valve stem 60 of the apparatus of Fig. 1 and it will be understood that the electromagnetic means for operating the valve stem 60 of the mechanism of Fig. 1 may conveniently be used as the operating mechanism for the valve stem 162 of the apparatus of Fig. 4.

The control valve 151 includes a casting 170 that is provided with a control chamber 171. This control chamber 171 communicates with passages 172, 173 and 174 which lead to the exterior walls of casting 170. The passage 174 continuously communicates with the control chamber 171 but the passages 172 and 173 are placed selectively into communication with the control chamber 171 by means of a valve head 175 that may be controlled by a valve stem 176.

The pressure chamber 114 may be subjected to any source of fluid pressure in any desired manner and is herein shown as connected to the inlet side of valve casing 116 by means of a pipe 180. The sealing chamber 115 communicates with the passage 174 and therefore with the control chamber 171 of control valve 151 by means of a pipe 181. The passage 160 of control valve 150 is connected to the passage 173 of control valve 151 by a pipe 182. The passage 161 of control valve 150 is connected to passage 172 of control valve 151 by a pipe 183.

With the parts in the position shown, pressure chamber 114 is connected to sealing chamber 115 so that the pressures therein are equal. It will be noted that pressure from the inlet of valve casing 116 is transmitted to pressure chamber 114 by pipe 180 and from pressure chamber 114 to sealing chamber 115 by means of passages 156 and 155, control chamber 154, passage 160, pipe 182, passage 173, control chamber 171, passage 174, and pipe 181. Since the pressures in pressure chamber 114 and sealing chamber 115 are equal, the diaphragm 113 has moved downwardly to the position shown in Fig. 4 of the drawings under the influence of counter-weights 140 and 141 and the valve disc 131 is engaged with the valve seat 130 under the influence of counter-weight 134. If the valve head 159 is now moved upwardly in response to a change in some condition, such as a call for heat by a room thermostat as shown in the system of Fig. 3, passage 155 will be closed off so that fluid can no longer flow from the pressure chamber 114. Also, sealing chamber 115 will be placed in communication with exhaust pipe 158 by means of pipe 181, passage 174, control chamber 171, passage 73, pipe 182, passage 160, control chamber 154, and passage 157 to exhaust pipe 158. Pressure is no longer permitted to drain from pressure chamber 114 and sealing chamber 115 is exhausted. As a result, the pressure in pressure chamber 114 becomes greater than the pressure in sealing chamber 115 so that diaphragm 113 is moved upwardly. After the lost motion between bracket 143 and pin 144 has been taken up, continued upward movement of diaphragm 113 serves to raise valve disc 131 from valve seat 130 whereupon communication is established between inlet 117 and outlet 118. If, while valve head 159 is raised so as to prevent the flow of fluid from pressure chamber 114 and to connect sealing chamber 115 to exhaust pipe 158, valve head 175 is raised, the pressure chamber 114 and sealing chamber 115 are again placed in communication with each other and exhausting from sealing chamber 115 is prevented. Pressure chamber 114 under these conditions is connected to sealing chamber 115 by passages 156 and 161, pipe 183, passage 172, control chamber 171, passage 174 and pipe 181. Fluid can no longer flow to the exhaust pipe 158 from sealing chamber 115 by way of pipe 182 since the passage 173 is now closed off by valve head 175. With the pressures again equalized in pressure chamber 114 and sealing chamber 115, the diaphragm 113 will move downwardly under the influence of counter-weights 140, 141 and 134. This downward movement will first result in seating of valve disc 131 upon valve seat 130. Thereafter, continued downward movement of diaphragm 113 will continue by means of counterweights 140 and 141, the lost motion connection between valve stem 132 and bracket 143 permitting such continued downward movement of diaphragm 113 after valve disc 131 seats upon valve seat 130.

If valve head 159 now returns to the position shown in Fig. 4 of the drawings but valve head 175 remains in its raised position, the pressures in pressure chamber 114 and sealing chamber 115 will remain equal and the parts will remain in the position shown in Fig. 4.

The valve head 159, as previously pointed out, may conveniently be controlled by room temperature conditions and the valve head 175 may conveniently be controlled by heater conditions and thereby operates as a high limit control to prevent opening of the main valve in the event the heater condition which controls the valve head 175 becomes excessive.

The control valve 150 additionally includes a manually operable valve 185 which is arranged to close off the passage 155 upon manual manipulation whereby to prevent the flow of fluid from the pressure chamber 114. Such manual manipulation of valve 185 also serves to connect passages 160 and 157. As a result, sealing chamber 115 is connected to exhaust pipe 158 through pipe 181, passage 174, control chamber 171, passage 173, pipe 182, and passage 160 if the valve head 175 be in its lowermost position, due to a failure in electrical power or the like. But if the manual valve 185 is so manipulated when the valve 175 is in its upper position because of excessive heater conditions or the like, the sealing chamber 115 is connected to pressure chamber 114 by means of pipe 181, passage 174, control chamber 171, passage 172, pipe 183, passage 161 and passage 156. By this arrangement, provision is made for manually causing opening of the main valve irrespective of the operation of valve head 159 but the arrangement further is such that the main valve cannot be opened if the valve head 175 is in a position indicating that the main valve should be closed.

In the apparatus of Fig. 4, the diaphragm 113 is also utilized to operate control devices other than the main valve. In order to accomplish this, an operating lever 190 is secured to a shaft 191, as by the screw and nut arrangement 192, the shaft 191 extending exteriorly of the upper casing 112 and being sealed thereto in a manner similar to that shown in Fig. 2 so as to prevent the escape of fluid from the sealing chamber 115 while permitting rotary motion of shaft 191. The left hand end of the operating lever 190 terminates substantially centrally of the diaphragm 113 and carries a roller 193 which is adapted to be engaged by the counterweight 140 upon upward movement of the diaphragm 113. A lever 194, which is located exteriorly of the casing 112, has one of its ends secured to the shaft 191 and carries a roller 195 at its other end. This lever 194 is connected to a secondary air damper arm 196 by a link 197, the secondary air damper arm 196 being pivoted to a bracket 198. A counterweight 199 is adjustably mounted upon the secondary air damper arm 196 and operates to bias the operating lever 190 to the position shown.

The lever 194 in addition to operating the secondary air damper arm 196 also preferably operates an expanding or flare pilot. A flare pilot casting 200 is secured to the lower casting 111, there preferably being a bracket 201 and suitable sealing gaskets 202 interposed between the lower casting 111 and the expanding pilot casting 200. This pilot casting 200 is provided with an inlet chamber 203 that communicates with the pressure chamber 114 by means of a passage 204. The flare pilot casting is also provided with an outlet chamber 205 which communicates with a pipe 206 that may lead to a pilot light as is usual in the art.

Communication between inlet chamber 203 and outlet chamber 205 is controlled by a pilot valve 207 that is secured to a valve stem 208. The casting 200 screw-threadedly receives a plug 209 which in turn screw-threadedly receives an adjustable stop member 210 which may be adjusted to maintain the pilot valve 207 in a predetermined minimum open position. The pilot valve 207 is biased towards closed position and into engagement with the adjustable stop 210 by means of a coiled spring 211. Suitable packing 212 is placed about valve stem 208. A coiled spring 213 has one of its ends abutting the packing 212 and its other end abutting an abutment 214 that is threaded into the stop member 210.

The bracket 201 supports a pilot operating lever 215 in pivotal fashion as indicated at 216. This lever 215 is provided with an adjustable screw 217 that is adapted to engage the valve stem 208. The lever 215 is further provided with an upper semi-circular cam surface 218 and a lower semi-circular cam surface 219 which are adapted to cooperate with the roller 195 in a manner to be explained hereinafter.

The operation of the complete apparatus of Fig. 4 will now be explained. With the parts in the position shown, this pilot valve 207 is open a minimum amount as determined by the stop 210 so that a constant minimum supply of gas is flowing to the pilot pipe 206. The main valve is closed and the secondary air arm 196 is in position to close the secondary air damper. Now if the valve head 159 is raised as heretofore described, the diaphragm 113 will begin moving upwardly. Initial upward movement of diaphragm 113 causes clockwise rotation of shaft 191 whereupon the right hand ends of levers 194 and 196 start moving downwardly. Such downward movement of the right end of lever 196 begins opening the secondary air damper. Downward movement of the right end of lever 194 causes the roller 195 to begin moving out of the semi-circular cam portion 218 and towards the semi-circular cam surface 219. As a result, the screw 217 moves to the left thereby moving pilot valve stem 208 to the left and opening pilot valve 207 more widely. A larger supply of gas therefor flows to the pilot pipe 206 whereby the pilot flame is expanded. As the upward movement of the diaphragm 113 continues, the lost motion between pin 144 and bracket 143 is taken up and the main valve disc 131 is raised from the seat 130. Gas therefore flows to the main burner and is ignited by the expanded pilot. As the upward motion of diaphragm 113 continues, roller 195 moves into the semi-circular cam surface 219 whereupon spring 211 returns the pilot valve 207 and lever 215 to the position shown in Fig. 4. The pilot is now again contracted, the secondary air damper is completely open and the main valve is completely open. Now if the valve head 159 returns to the position shown, or if the valve head 175 is moved to its upper position, the pressures in pressure chamber 114 and sealing chamber 115 are again equalized as heretofore explained. Diaphragm 113 begins moving downwardly and valve disc 131 immediately moves towards closed position. After the valve disc 131 has completely seated upon the seat 130, the diaphragm 113 continues its downward motion until it reaches the position shown in Fig. 4. During this downward motion of diaphragm 113, the operating lever 190 should follow the same due to the biasing action of counterweight 199. Such downward movement of operating lever 190 results in closing secondary air damper and moves the roller 195 from the cam surface 219 to the cam surface 218 so that the pilot valve 207 is again momentarily opened widely during the shut-down operation. But if the pilot valve or the secondary air damper or any of the interconnecting mechanism should stick and thereby prevent the operating lever 190 from following the downward movement of diaphragm 113, then diaphragm 113 can nevertheless move downwardly because of the one way connection between it and the operating lever 190.

The casting 152 of control valve 150 is shown provided with a passage 225 and upper casting 112 is shown as provided with a passage 226. However, communication between these passages is prevented by the gasket 153. However, if it be desired to omit the control valve 151, then a different gasket 153 having an opening therein to provide communication between passages 225 and 226 can be substituted or the gasket 153 may be arranged so that turning it to a different position establishes such communication. The pipes 182 and 183 under these conditions would be removed and the passages 160 and 161 plugged. Then when the valve head 159 is in the lower position shown, pressure chamber 114 would communicate with sealing chamber 115 in the same manner as disclosed in Fig. 1 and upward movement of valve head 159 would prevent the flow of fluid from pressure chamber 114 and connect the sealing chamber 115 to the exhaust pipe 158 in the same manner as disclosed in Fig. 1. In this manner, the apparatus of Fig. 4 may be interchangeably used either with or without an auxiliary control valve such as a limit control valve.

With the apparatus of Fig. 4, irrespective of whether it be used with a single control valve or two control valves, rupture of diaphragm 113 will cause an equalization of pressures in the pressure chamber 114 and sealing chamber 115 so that the diaphragm 113 moves to its lowermost position, as shown in Fig. 4, and the valve disc 131 seats upon the valve seat 130 in the same manner as the corresponding parts of the apparatus of Fig. 1 return to the position shown in Fig. 1 upon rupture of diaphragm 13 thereof.

Inasmuch as all secondary air dampers do not operate in the same direction in order to cause opening of the same, it is desirable to arrange the apparatus so that the secondary air arm 196 can be made to move either up or down upon upward movement of operating lever 190. If reverse movements of the secondary air arm 196 are desired, it is only necessary to remove the pivoting member 230 by which the link 197 is pivoted to arm 196 and to connect the link 197 to the arm 196 by means of an opening 231 which is formed in the arm 196 on the opposite side of bracket 198. Where such rearrangement of parts are made, the counter-weight 199 operates to offset part of the weight of the secondary air damper, the secondary air damper causing movement of the lever 190 in a downward direction so as to follow the downward movement of the diaphragm 113.

It will be noted that the apparatus of the present invention provides an arrangement in which a single motor positively operates a first control device such as a main gas valve and is additionally arranged to operate a second control device such as a secondary air damper to one position, the arrangement being such that if a second control device fails to return from such position, the motor means can nevertheless operate the first control device or main valve. This positively provides for closing of the main valve when it should be closed even though the auxiliary apparatus controlled by the same motor fails to return to its original position because of sticking or for some other reason. It will be further noted that this operation of the second control device is obtained by having an operator extend into the path of movement of the motor which in this case is a movable wall or diaphragm. The present invention also provides an arrangement in which either a secondary air damper or a flare pilot, or both, are operated at least partially, prior to opening of the main valve. The present invention also contains many other novel features which will now be apparent.

It will be readily appreciated that many changes can be made in the specific embodiments herein disclosed without departing from the spirit of the present invention and we therefore intend to be limited only by the scope of the appended claims.

We claim:

1. In combination, a burner, a fuel valve in control of the flow of fuel to said burner, a pair of pressure chambers defined by a movable wall, connections between said movable wall and fuel valve, the movable wall and fuel valve normally tending to assume a given position, a first control valve and connections operative selectively to subject both of said pressure chambers to the fuel pressure or to exhaust a first of said chambers while maintaining the second of said chambers subject to the fuel pressure whereby said movable wall and fuel valve are either permitted to move to said given position or are forcibly moved therefrom, a second control valve selectively operable to permit such control by said first control valve or to subject both of said pressure chambers to the fuel pressure irrespective of the position of said first control valve whereby the movable wall and fuel valve move to said given position, and a third control valve operable to subject the second of said chambers to fuel pressure while exhausting said first chamber irrespective of the position of said first control valve.

2. In combination, a burner, a valve in control of the supply of fuel to the burner, an air damper in control of the supply of air to the burner, a flare pilot valve, a pressure motor having a wall movable to first and second positions, connections between said movable wall, fuel valve, air damper, and flare pilot valve operable to open the fuel valve and air damper and momentarily to open said flare pilot valve upon movement of the wall from said first position to said second position, and means in control of said motor.

3. In combination, a burner, a fuel valve in control of the flow of fuel to the burner, a flare pilot valve, a pressure motor having a wall movable from a first position to a second position, a direct connection between said flare pilot valve and movable wall operable to open said flare pilot valve upon initial movement of said movable wall from said first position to said second position, a lost motion connection between said movable wall and fuel valve operative to open the fuel valve only after the flare pilot valve has been opened when the movable wall is so moved, and means in control of said pressure motor.

4. In combination, a burner, a fuel valve in control of the flow of fuel to the burner, a flare pilot valve, a pressure motor including a movable wall, a direct connection between said movable wall and said flare pilot, and a lost-motion connection between said movable wall and said fuel valve.

5. In combination, a burner, a fuel valve in control of the burner, a pressure motor including a movable wall, a connection between said movable wall and fuel valve, an operator extending into the path of movement of said movable wall and engageable thereby when moving in valve opening direction, an air damper connected to said operator, a flare pilot valve, and connections between said operator and flare pilot valve, the one-way connection thus produced between said movable wall and air damper and flare pilot permitting movement of said movable wall to fuel valve closed position irrespective of movement of said air damper.

6. In combination, a burner, a fuel valve in control of the flow of fuel to said burner, a pressure motor including a movable wall, an operator normally engaged with the movable wall and movable thereby in only one direction, an air damper arm and a flare pilot valve connected to said operator for operation thereby when so moved, and a lost-motion connection between said movable wall and fuel valve.

7. In combination, a pressure motor, a fuel valve controlled thereby, an operator also controlled by the pressure motor, a pilot valve, and connections between the operator and pilot valve including cam means operative to momentarily flash said pilot upon movement of said operator in a single direction.

8. In combination, a pressure motor including a movable wall, a fuel valve, connections between said movable wall and fuel valve for operating the same, an operator extending into the path of movement of said movable wall when moving in fuel valve opening direction, a pilot valve, connections between said pilot valve and operator to open said pilot valve when the movable wall moves in fuel valve opening direction, and control means to vary the pressure to which said movable wall is subjected.

9. In combination, a pressure motor including a movable wall, a fuel valve, a lost-motion connection between said fuel valve and movable wall, an operator extending into the path of movement of said movable wall when moving in fuel valve opening position and arranged to be moved thereby upon initial movement of the movable wall in fuel valve opening direction, a pilot valve controlled by said operator, and control means to vary the pressure to which said movable wall is subjected.

10. In combination, a burner, a fuel valve in control of the flow of fuel to the burner, a flare pilot valve, a pressure motor having a movable wall actuated by changes in the relative pressure on opposite sides of said wall, a lost motion connection between said valve and said diaphragm and a direct connection between said diaphragm and said flare pilot valve such that upon movement of said movable wall in one direction, said flare pilot valve is first opened to its full open position and upon further movement of the wall, said fuel valve is moved to open position, and control means operative upon a decrease in temperature of a space heated by said burner, to vary the relative pressure on opposite sides of said diaphragm so as to cause said diaphragm to move upwardly to first fully open the pilot valve and to then open said fuel valve.

FREDERICK S. DENISON.
CARL G. KRONMILLER.